United States Patent [19]

Kim

[11] Patent Number: 5,240,290
[45] Date of Patent: Aug. 31, 1993

[54] ADAPTER ASSEMBLY FOR BRANCHING A PIPE

[76] Inventor: Joo H. Kim, 67-3, Dodang-Dong, Bucheon-City, Kyungki-Do, Rep. of Korea

[21] Appl. No.: 769,788

[22] Filed: Oct. 2, 1991

[30] Foreign Application Priority Data

Apr. 30, 1991 [KR] Rep. of Korea ............ 6931/91

[51] Int. Cl.⁵ .................................. F16L 35/00
[52] U.S. Cl. ............................... 285/40; 285/197
[58] Field of Search ........................ 285/40, 197

[56] References Cited

U.S. PATENT DOCUMENTS 3,349,792 10/1967 Larkin ...................... 285/40 X
3,606,398 9/1971 Bocceda .................... 285/197
3,863,960 2/1975 Andersson ................. 285/40 X
3,870,064 3/1975 Vigneron ................. 285/197 X

FOREIGN PATENT DOCUMENTS 1294758 5/1969 Fed. Rep. of Germany ........ 285/40

Primary Examiner—Dave W. Arola
Attorney, Agent, or Firm—Foley & Lardner

[57] ABSTRACT

The branch pipe adapter assembly comprises an elongated member defining an insertion part, a body part and a connecting part with an aperture axially formed therethrough to permit fluid communication through the insertion part, the body and the connecting part. The insertion part further includes a terminal end and defines a tapered and externally threaded cylinder with the taper beginning at the terminal end of the insertion part and gradually increasing therefrom. A thread forming means forms threads in the wall of a branch hole formed in a main pipe, and is positioned at the tapered and externally threaded cylinder. A fitting member is used with an aperture formed therethrough to permit the insertion part to be received therethrough and with the front end being concave in order to matingly receive a portion of the convex external surface of the main pipe. A sealing means seals the fitting member against the convex external surface of the main pipe and seals the fitting member against the body of the elongated member upon aligning the aperture of the fitting member with the branch hole and inserting the terminal end of the insertion part through the aperture of the fitting member into the branch hole such that the tapered and externally threaded cylinder of the insertion part contact the wall of the branch hole and upon rotating the tapered and externally threaded cylinder of the insertion part gradually moves the terminal end of the insertion part further into the main pipe enabling the thread forming means to cutably engage the wall of the branch hole to form internal threads in the wall and to sealably engage the sealing means whereupon the adapter assembly is threadably secured in the branch hole and is sealed against unintended leakage while enabling fluid communication with the fluid in the main pipe through the aperture formed in the elongated member.

9 Claims, 4 Drawing Sheets

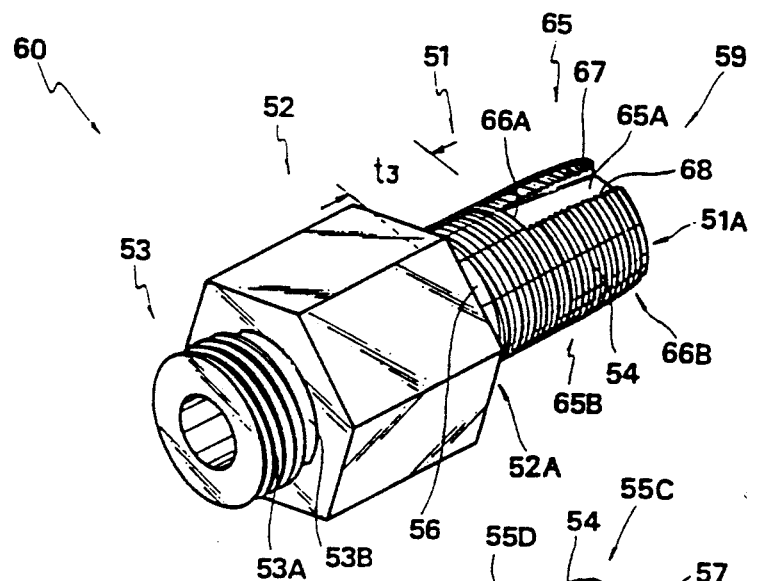
FIG. 2B
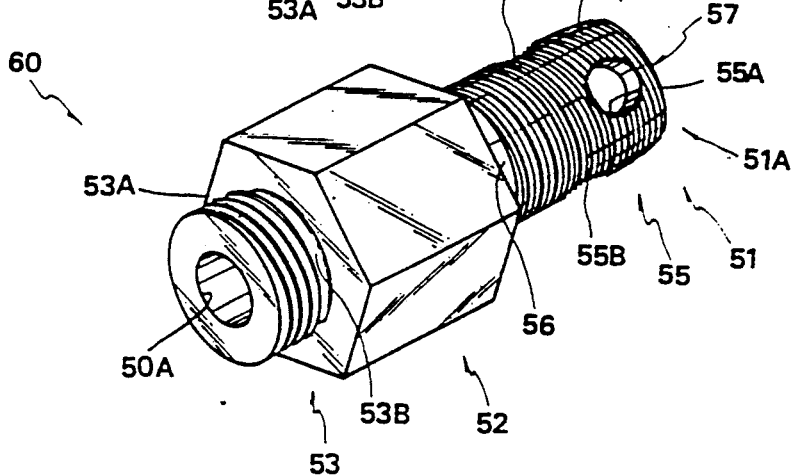
FIG. 2A
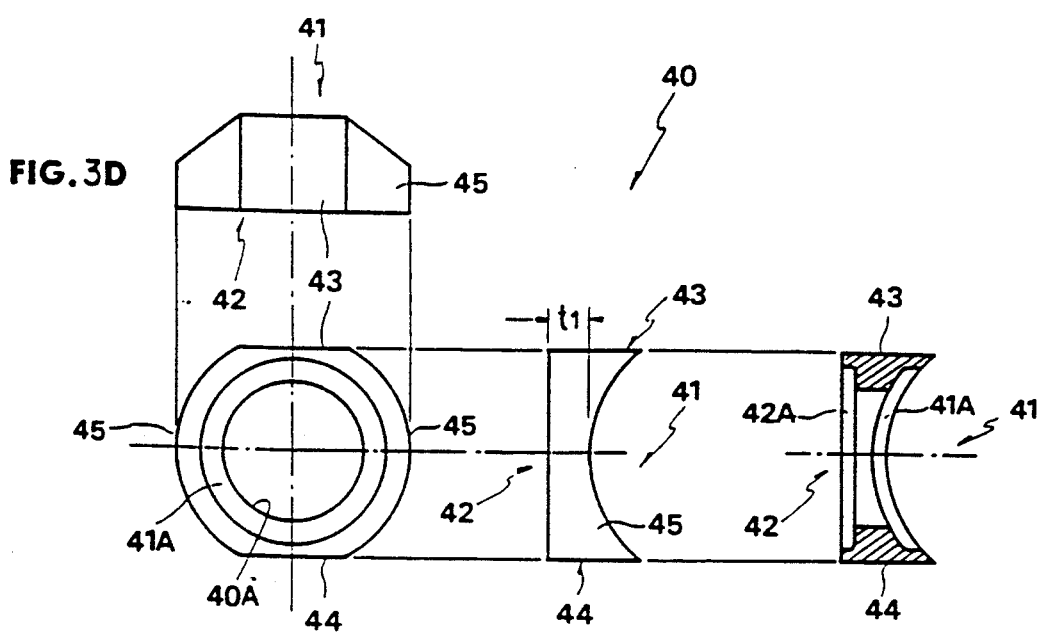
FIG. 3D
FIG. 3A  FIG. 3B  FIG. 3C

ADAPTER ASSEMBLY FOR BRANCHING A PIPE

BACKGROUND OF INVENTION

Field of the Invention

The invention relates to an adapter assembly which enables a main pipe to be divided or branched, and more particularly, to an adapter assembly for dividing a main pipe and which can be directly connected to the main pipe and which enables a connection of the main pipe to another pipe or control valve.

Information Disclosure Statement

Generally, for branching a pipe which has already been installed and which is in use conducting the flow of fluid such as gas, oil and the like, an auxiliary pipe must be connected to the installed or main pipe. To accomplish this, the installed pipe is severed, then two ends of a "T" shaped joint pipe are connected to the cut ends of the pipe and another pipe or control valve is connected to the remaining end of "T" shaped pipe. The installed pipe is now branched at the "T" shaped joint.

The process of branching a pipe by using an auxiliary member ("T" shaped pipe) is time consuming, awkward and requires complete access to the pipe to allow the complete severing of the installed pipe. Also, when a branch pipe is desired at a number of places, the installed pipe must be severed at each desired location and a "T" shaped joint provided for each location. This compounds the problem associated with the process since the time necessary for completing each operation when added together for the entire operation makes the operation costly to complete.

Accordingly, it is an object of the present invention to provide an adapter assembly for easily adding a branch pipe to a previously installed pipe.

It is a further object of the present invention to provide an adapter assembly which can be attached to the pipe at a desired location on the pipe without the necessity of severing the pipe.

It is a further object of the present invention to provide an adapter assembly which permits attachment of a control valve or of another pipe thereto.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

An adapter assembly for branching a main pipe according to the present invention is defined by the claims with a specific embodiment shown in the attached drawings. For the purpose of summarizing the invention, the invention relates to a branch pipe adapter assembly for use with a fluid carrying main pipe having a convex external surface and with a walled branch hole formed therein and comprises an elongated member defining an insertion part, a body and a connecting part. An aperture is formed in the elongated member to enable fluid communication through the insertion part, the body and the connecting part. The insertion part further includes a terminal end and defines a tapered and externally threaded cylinder. The taper begins at the terminal end of the insertion part and gradually increases in diameter therefrom. A thread forming means forms threads in the wall of the branch hole of the main pipe. The threads forming means is positioned on the tapered and externally threaded cylinder of the insertion part. A fitting member is used which has a front end and a rear end. An aperture extends completely through the fitting member which permits the insertion part to be received therethrough. The front end of the fitting member is concave in order to matingly receive a portion of the convex external surface of the main pipe. A sealing means seals the fitting member against the convex external surface of the main pipe and also seals the fitting member against the body of the elongated member upon aligning the aperture of the fitting member with the branch hole. The terminal end of the insertion part is inserted through the aperture of the fitting member into the branch hole such that the external threads of the tapered and externally threaded cylinder of the insertion part contact the wall of the branch hole. Rotating the tapered and externally threaded cylinder of the insertion part gradually moves the terminal end of the insertion part into the main pipe which enables the thread forming means to cutably engage the wall of the branch hole and form internal threads in the wall and sealingly engage the sealing means such that the adapter assembly is threadably secured in the branch hole and is sealed against unintended leakage while enabling fluid communication with the fluid in the main pipe through the aperture formed in the elongated member.

Preferably, the sealing means comprises a portion of the insertion part positioned between the external threads and the body which has a smooth cylindrical surface for receiving, in use, a first washer and a second O-ring in a sealing engagement.

The thread forming means comprises a plurality of openings, a first opening, a second opening, a third opening and a fourth opening, which are formed in the tapered and externally threaded cylinder of the insertion part proximate the terminal end of the insertion part and which are in fluid communication with the aperture of the elongated member.

The openings also enable any shavings or turnings which result from the cutting of the internal threads into the wall of the branch hole to fall away from the thread cutting-branch hole interface. In the event the turnings were not allowed to fall away from this interface, the newly formed threads would be destroyed or deformed by the shavings or turnings during the rotation of the tapered and externally threaded cylinder of the insertion part during the thread forming process.

The first opening and the third opening, the second opening and the fourth opening are preferably formed at evenly spaced intervals about the tapered and externally threaded cylinder. Further, paired opposite openings are preferably axially spaced apart relative to each other such that one pair of opposing openings are positioned closer to the terminal end of the insertion part relative to the remaining pair of opposing openings which are positioned further away from the terminal end of the insertion part.

The front end and the rear end of the fitting member preferably each include an O-ring receiving cavity formed therein, respectively. In this case the sealing means comprises a first and a second O-ring for positioning into the O-ring cavity, respectively. This construction enables O-ring positioned in the O-ring cavities to sealingly engage the convex external surface of the main pipe and the body of the elongated member, respectively.

Another embodiment of the thread forming means comprises a plurality of grooves, a first groove and a second groove, formed in the externally threaded cylinder of the insertion part with each groove extending longitudinally from the terminal end of the insertion part and being open at the terminal end of the insertion part to enable the turnings to fall away from the thread cutting-branch hole interface.

The connecting part of the elongated member preferably includes external threads formed therein to enable an internally threaded control valve, another pipe, or the like, to be threadably secured thereto and a sealing means to seal the control valve, or the like, against the body of the elongated member. Thus, upon rotating the control valve to threadably engage the external threads of the connecting part, the control valve moves toward the body and engages the sealing means to sealingly engage and threadably secure the control valve to the elongated member. This seals the joint between the connecting part and the body against unintended leakage.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 2A is a perspective view of the first embodiment of an adapter;

FIG. 2B is a perspective view of the second embodiment of an adapter;

FIG. 3A is a front view of a fitting member;

FIG. 3B is a side view of a fitting member;

FIG. 3C is a vertical sectional view of a fitting member;

FIG. 3D is a plane view of a fitting member;

Similar reference characters refer to similar parts throughout the several views of the drawings.

DETAILED DESCRIPTION OF THE INVENTION

Figure 1:
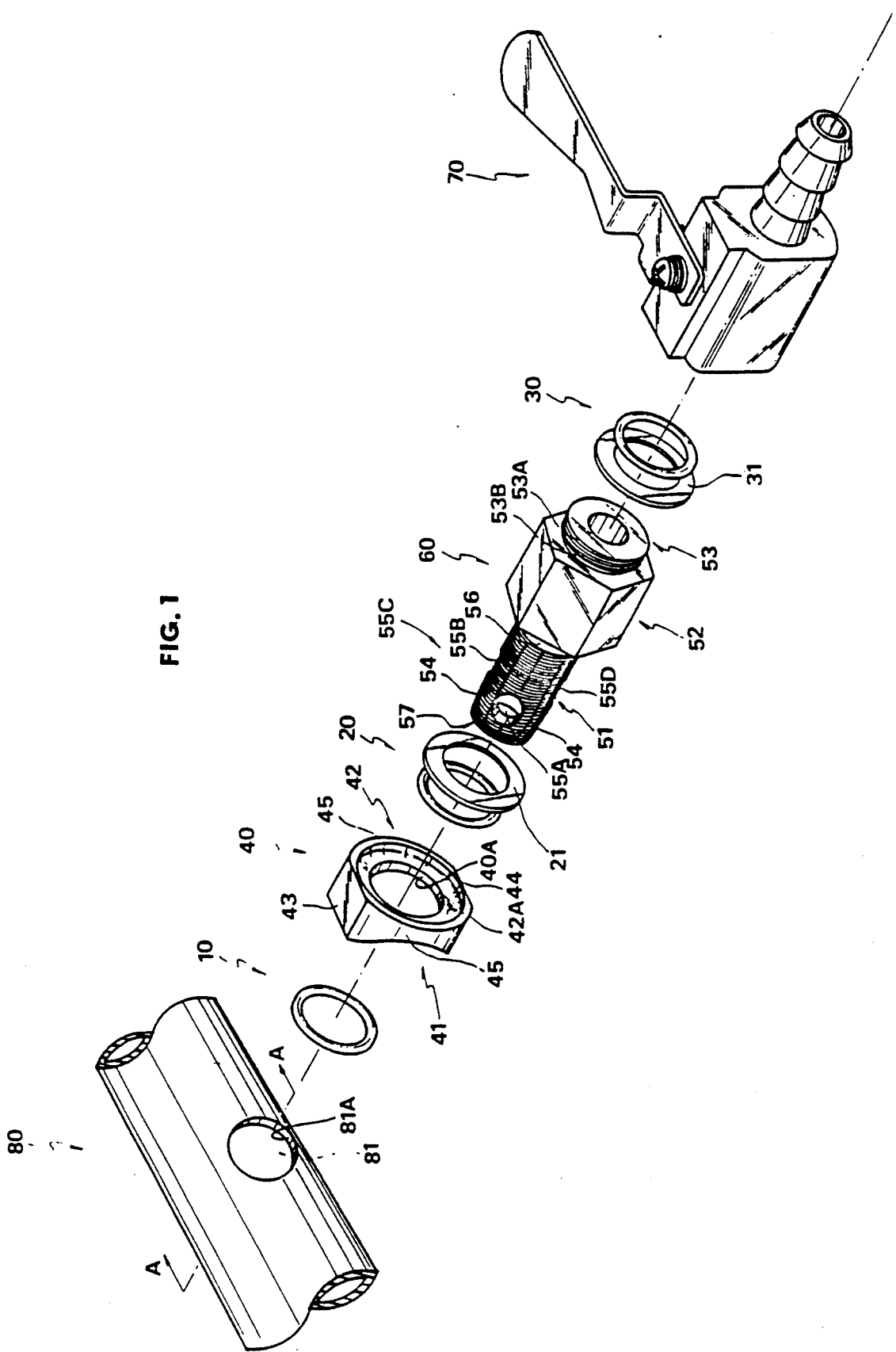
FIG. 1 is an exploded perspective view of the present invention.

FIG. 1 is an exploded perspective view showing the elements which constitute the present invention.

Positioned against the previously installed pipe 80 are a first O-ring 10 followed, in order, by a fitting member 40, a second O-ring 20, a first washer 21 and an elongated member 60, a second washer 31 and a third O-ring 30. The first O-ring 10, the second O-ring 20 and the third O-ring 30 are made of a resilient material, such as rubber, in order to form a fluid tight seal upon pressured engagement. Such rings are well known in the art so that a detailed description thereof is not necessary.

Figure 4:
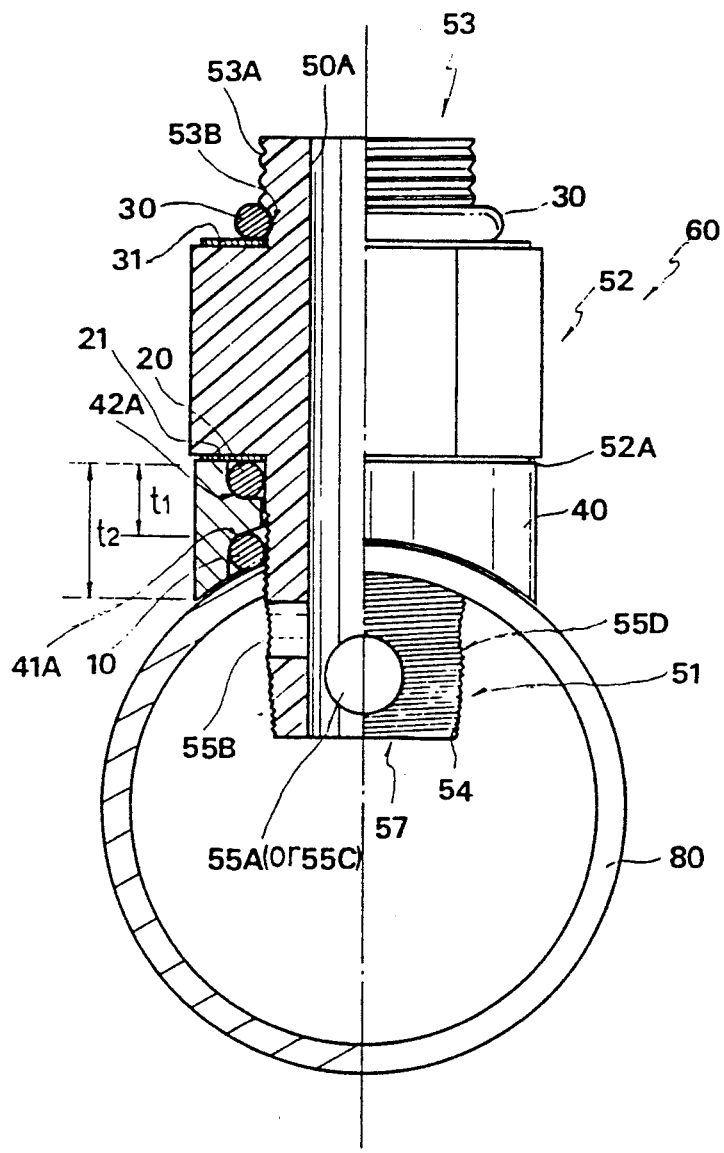
FIG. 4 is a sectional view taken along the line A—A of FIG. 1 with parts being assembled.

FIG. 2A is a perspective view of the first embodiment of the elongated member. The elongated member 60 includes an insertion part 51 having a terminal end 51A, a connecting part 53 and with a body 52 positioned therebetween. An aperture 50A is axially formed through the elongated member 60 to permit fluid communication therethrough. The aperture 50A extends through the insertion part, the body and the connection part to provide fluid communication through the insertion part and the connection part, as illustrated at FIGS. 2A, 2B and 4.

The insertion part 51 defines a tapered and externally threaded cylinder 54. The outer diameter of the insertion part 51 gradually increases toward the body 52 to form the tapered and externally threaded cylinder 54. A portion of the insertion part 51 positioned between the external threads and the body 52 has a smooth cylindrical surface 56 for receiving, in use, the first washer 21 (FIG. 1) and the second O-ring 20 (FIG. 1) in a sealing engagement.

The insertion part 51 further includes a thread forming means 55 formed in the thread cylinder 54 of the insertion part 51. A detailed structure of the thread forming means 55 is described with reference to FIGS. 2A and 2B.

A first opening 55A, a second opening 55B, a third opening 55C and a fourth opening 55D, which are in fluid communication with the aperture 50A of the elongated member 60, are formed proximate the terminal end 51A of the insertion part 51. Third opening 55C is formed opposite first opening 55A and the second opening 55B is formed opposite the fourth opening 55D. The four openings 55A, 55B, 55D have the same diameter relative to each other.

The first opening 55A and the third opening 55C, the second opening 55B and the fourth opening 55D are formed at the terminal end 51A of the insertion part 51 at regular intervals. Thus, an opening is formed at about 90, 180, 270 and 360 degrees of circumference of the insertion part 51. Preferably, each pair of the opposite openings are offset relative to each other. Thus, openings 55A and 55C are formed closer to the terminal end 51A of the insertion part 51 relative to openings 55B and 55D which are formed further away from the terminal end 51A of the insertion part 51. Preferably, pairs of opposing openings (55A-55C, 55B-55D) are spaced apart on the insertion part 90 degrees laterally from each other and a distance of one-half of the diameter of opening, which are all of the same diameter.

The external surface of the body 52 is polygonally shaped in order to receive the jaws of a tool, such as a wrench, to enable rotation of the elongated member 60.

Figure 5:
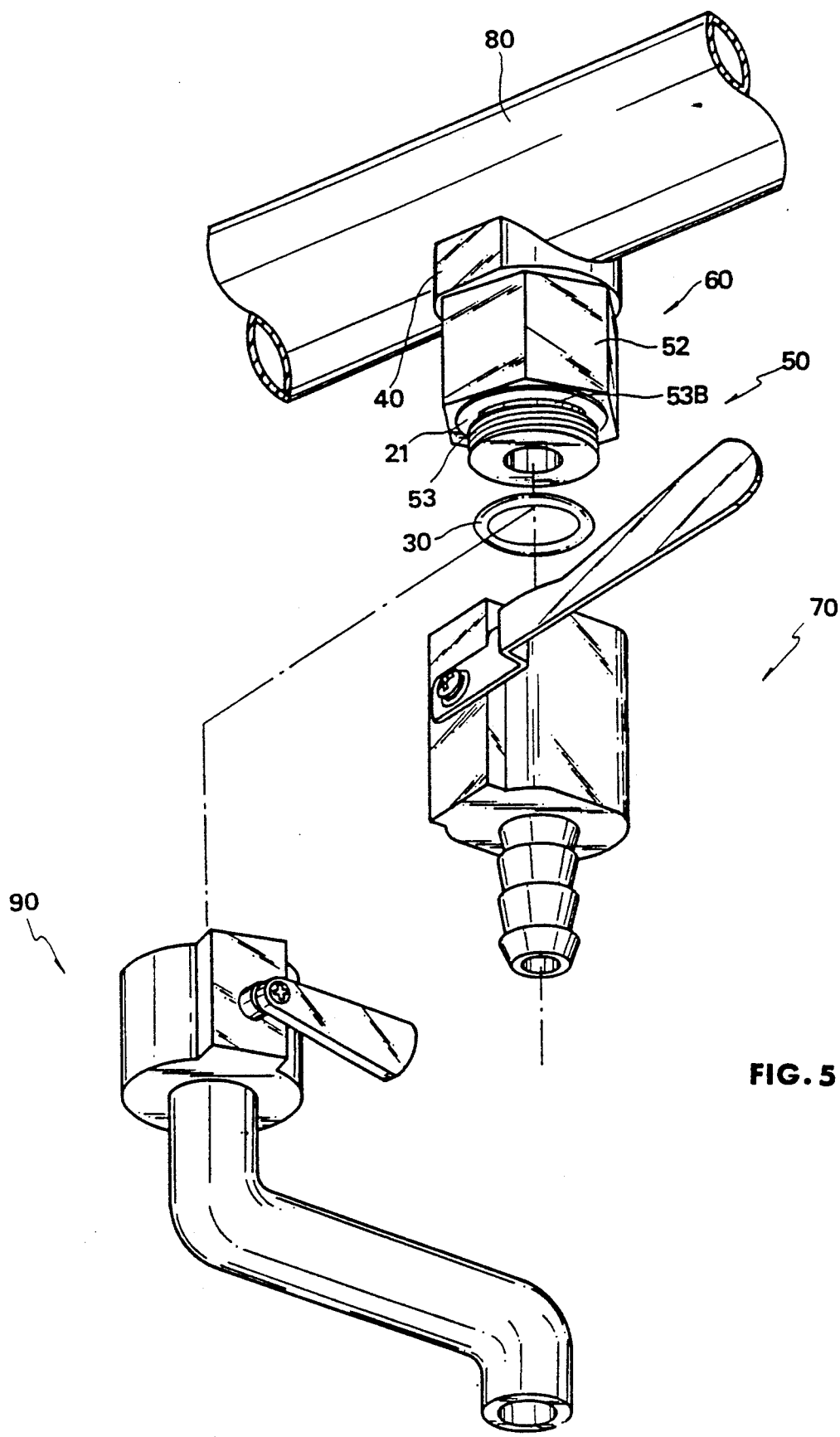
FIG. 5 is an exploded perspective view of the present invention in use.

The external surface of the connecting part 53 includes external threads 53A which may be used to threadably engage the control valve 70 (FIG. 1) or another pipe (FIG. 5). Preferably, a groove 53B, having a certain depth, is formed between the external threads 53A of the connecting part 53 and the body 52. The second washer 31 (FIG. 1) and the third O-ring 30 (FIG. 1) are positioned on the groove 53B of the connecting part 50. The third O-ring is preferably tensioned against the groove 53B.

FIG. 2B is a perspective view of the second embodiment of the elongated member illustrating another structure of a thread forming means which structurally differs from the thread forming means illustrated in FIG. 2A.

A first groove 65A and a second groove 65B are formed in the externally threaded cylinder 54 of the insertion part 51. The first and second grooves 65A,65B extend longitudinally from the terminal end 51A of the insertion part 51 toward the body 52. The grooves 65A, 65B preferably terminate within the external threads formed on the external surface of the insertion part to protect against leakage if such grooves were to intrude into the smooth cylindrical surface 56 which receives the inner surface of the O-ring.

Preferably, grooves 65A and 65B are quadrilaterally shaped with a predetermined length, width and depth.

The body 52, the connecting part 53, and the externally threaded cylinder 54 are of the same structure as described for the first embodiment of the elongated member illustrated in FIG. 2A.

The structure of the fitting member 40 shown in FIG. 1 is described in detail with reference to FIGS. 3A, 3B, 3C and 3D.

FIG. 3A is a front view of the fitting member. FIG. 3B is a side view of the fitting member. FIG. 3C is a sectional view of the fitting member and FIG. 3D is a plan view of the fitting member.

The fitting member 40 is a cylindrical body with an aperture 40A formed therethrough to permit the insertion part 51 to be received therethrough. The fitting member includes a front end 41 and a rear end 42. The front end 41 is concave in order to matingly receive a portion of the convex external surface of the installed pipe 80. Of course, the radius of the curvature of the concave front end 41 will change in conformity with the radius of the curvature of the installed main pipe 80.

The front end 41 and rear end 42 of the fitting member each preferably further include an O-ring receiving cavity 41A and 42A formed therein, respectively. The O-ring receiving cavity 41A is formed on inner circumference of the front end 41 of the fitting member 40 with a certain width and depth. The O-ring receiving cavity 42A is formed on inner circumference of the rear end 42 of the fitting member 40 with a certain width and depth. Preferably the depth of the each ring receiving cavity 41A, 42A is about one-half of the thickness of the O-ring received 10,20.

The method of attaching the device of the present invention to the main pipe is described with reference to FIGS. 1, 2A and 3C.

First, a branch hole 81 is bored at a desired position on the main pipe 80. Preferably, the diameter of the branch hole 81 is equal to outer diameter of the terminal end 51A of the insertion part 51 of the elongated member 60.

The first O-ring 10 is positioned into the ring receiving cavity 41A and then the concave front end 41 of the fitting member 40 is positioned on the convex pipe with the aperture 40A of the fitting member being aligned with the branch hole 81 of the main pipe 80.

Thus, the first O-ring 10 in the ring receiving cavity 41A of the fitting member 40, is positioned against the peripheral surface of the branch hole 81 of the main pipe 80 since the concave shape of the fitting member receives the convex shape of the pipe 80 to enable contact with the O-ring 10 and, in use, a sealing engagement therebetween.

The front end 41 of the fitting member 40 is secured against the surface of the main pipe 80 by gripping the upper and lower surfaces 43, 44 of the fitting member with an implement such as a wrench to merely hold the surface of the fitting member matingly against the surface of the main pipe while the insertion part is being operatively positioned into the branch hole.

The body 52 of the elongated member 60 is formed of polyhedral shape, to enable rotation of the elongated member 60 by gripping the body 52 with an implement such as a wrench. Thus, the purpose of the body 52 is to provide a gripping structure for a wrench and to also provide a structure which may be tensioned against in order to sealably engage O-rings 20 and 30. The terminal end of the insertion part 51 of the elongated member 60 is then inserted into the aperture 40A of the fitting member 40 and rotated causing the terminal end 51A to pass into the branch hole 81 and enter into the interior of the main pipe 80.

Since the insertion part 51 of the elongated member 60 is tapered and has external threads 54, the insertion part 51 engages the wall of the branch hole 81 resulting the formation of internal threads on the wall 81A of the branch hole 81 and in a slight increase in the diameter of the branch hole 81 upon rotation of the insertion part against the wall of the branch hole 81 of the main pipe 80.

Upon further rotation of the elongated member 60, the insertion part 51 moves further into pipe 80 such that the first washer 21 and the second O-ring 20 are pressed between the body 52 and the fitting member 40 to form a sealing engagement therewith. The first washer 21 decreases the friction between the second O-ring 20 and the front end surface of the body 52 of the elongated member 60 upon rotation of the elongated member 60.

The hardness of the insertion part 51 of the elongated member 60 is greater than that of the main pipe 80 through special heat treatment of the insertion part 51 or the elongated member 60 itself. Of course, if the main pipe 80 is made of plastic, heat treatment of the insertion part or the elongated member is not needed. Therefore, it is possible to form internal threads on the wall of the branch hole 81 when the insertion part 51 is rotated.

The rotation of the insertion part 51 of the elongated member 60 into the branch hole 81 causes the first opening 55A and the third opening formed in the insertion part 51 to advance into the threads cut into the wall of the branch hole 81 by the external threads 54 of the insertion part. As a result of the openings 55A, 55C advancing along the internal threads of the branch hole 81 together with the gradually increasing diameter of the tapered inserted part upon rotation, the internal threads being cut into the wall of the branch hole 81 are cut deeper into the wall 81A.

Since the cross sections of the threads of screw 54 are exposed at the edge of the first opening 55A and the opening 55C respectively, these sections, especially the cross sections which are on the following edge of the opening, cutably engage the threads which are only slightly formed or cut into the wall of the branching hole 81 by the external threads of the insertion part 51 which precede the openings 55A and 55C.

After about one-half of the size of the first opening 55A and the third opening 55C have advanced into the branch hole 81 of the main pipe 80, the second opening 55B and the fourth openings 55D begin to advance into the branch hole and the process described for openings 55A and 55C is repeated by openings 55B and 55D further deepening the threads formed on the wall of the branch hole 81. The process described above is carried out until the insertion part 51 of the elongated member 60 is received completely into the main pipe 80 through the branch hole 81 and the body 52 engages the first washer 21 resulting in the second O-ring 20 to be sealingly engaged thereby.

In the process of rotation of the insertion part 51 of the elongated member 60, the cross sections of the threads 54 exposed at the peripheral edge of the each opening 55A, 55B 55C and 55D are rotated along the incomplete or shallow internal threads formed on the wall of the branch hole 81 by the external threads of the insertion part 51 which precedes the openings 55A, 55B 55C and 55D. This results in perfectly formed and well defined internal threads cut into the wall of the branch hole 81.

Thus, upon operatively positioning the adapter assembly, as described above, into the branch hole 81 of the pipe 80, deep well defined internal threads are formed into the wall of the branch hole 81 of the main pipe. This results in the external threads 54 of the insertion part of the elongated member 60 threadably securing the internal threads cut into the wall of the branch hole 81 during the rotational positioning of the elongated member 60 into the branch hole of the main pipe 80.

When the elongated member 60 is secured to the branch hole 81 of the main pipe 80, the first O-ring 10, the fitting member 40, the second O-ring 20 and the first washer 21 are tensioned against the main pipe 80 by the elongated member 60, as shown in FIG. 4. Thus, the first O-ring 10 received into the O-ring receiving cavity 41A formed on the inner circumference of the front end 41 of the fitting member 40, is tensioned against the wall of the branch hole 81 of the main pipe 80 and the front end 41 of the fitting member 40. The concave shape of the O-ring receiving cavity 41A at the front end 41 of the fitting member 40 (FIG. 3C) matingly receives the convex surface of the main pipe 80 which enables the first O-ring 10 to sealingly engage both the fitting member and the wall of the branch hole 81 when the elongated member 60 is tensioned against the main pipe to completely seal this joint. The second O-ring 20 received into the ring receiving cavity 42A formed on inner circumference of the rear end 42 of the fitting member 40 (FIG. 3C) enables the second O-ring to sealingly engage both the fitting member and the insertion part 51 of the elongated member 60. Thus, upon rotating the insertion part into the branch hole, the body simultaneously tensions against the first washer, the second O-ring, the fitting member and the first O-ring to completely seal the pipe-fitting member joint and the fitting member-body joint.

It is important to note that the portion of the insertion part 51 which exists between the external threads 54 and the body 52 preferably has a smooth cylindrical surface 56 which enables the second O-ring to be tightly secured against the smooth surface 56 of the insertion part to ensure a sealing engagement therebetween.

FIG. 4 illustrates the operative position of the adapter assembly secured to the main pipe 80. This figure shows that the distance t2 between the front end 52A of the body 52 and the outermost edge (relative to the center of the main pipe 80) of the any one of the opening(s) formed in the insertion part 51 is greater than narrowest width t1 of the fitting member 40. This relationship ensures that when the elongated member 60, the fitting member 40 and the main pipe 80 are secured together, each opening 55A, 55B, 55C and 55D is positioned completely within the main pipe 80.

As described above, openings 55A, 55B, 55C and 55D not only assist cutting internal threads into the wall of the branch hole of the main pipe but also facilitate fluid flow into the aperture 50A formed through the elongated member 60 from the main pipe.

The second washer 31 and then the third O-ring 30 are positioned on the elongated member between the body and the connecting part 53. The inner portion of the third O-ring fits into a groove 53B formed between the body and the externally threaded portion of the connecting part 53. Therefore, upon threadably securing a device, such as a control valve 70 or another pipe, onto the connecting part 53, the third O-ring 30 is sealingly tensioned against the second washer 31 and the control valve 70, for example, to provide a leak free junction. Preferably the groove 53B formed in the connecting part between the body and the externally threaded portion of the connecting part 53 has a depth of about one-half of the thickness of the third O-ring 30.

The first washer 21 and the second washer 31 decrease the friction occurring between the body 52 of the elongated member 60 and the second O-ring 20 and third O-ring 30, respectively, when the body is rotated against the fitting member and when the control valve 70, or the like, is rotated against the body.

FIG. 2B is a perspective view of the second embodiment of the elongated member of the present invention.

The elongated member 60 includes an insertion part 51, a connecting part 53 and a body therebetween. These are the same as the above described structures for the first embodiment of the elongated member 60 illustrated at FIG. 2A. The difference between the first embodiment and the second embodiment of the elongated member is the structure of the thread forming means. In the second embodiment the thread forming means 65 comprises a plurality of grooves 59, such as a pair of rectangular grooves 65A, 65B formed in the external surface of the insertion part 51. The first groove 65A and the second groove 65B preferably extend axially from the terminal end of the insertion part toward the body 52 for a predetermined length. The grooves 65A, 65B preferably terminate within the external threads formed on the external surface of the insertion part to protect against leakage. That is, the grooves 65A, 65B do not extend into the sooth cylindrical surface 56 which receives the inner surface of the O-ring. The plurality of grooves, such as grooves 65A, 65B, are preferably symmetrically formed in the tapered and externally threaded cylinder of the insertion part.

The cross sections of the external threads 54 formed on the external surface of the insertion part 51 are exposed at the top edge of both side walls 67,68 of the first groove 65A and the second groove 65B (not shown). This in combination with the taper of the insertion part enables the rotationally driven advancing grooves 65A, 65B to cut the internal threads deeper into the wall of the branch hole 81 with the completion of each rotation of the elongated member 60. Thus, upon rotation of the insertion part 51 against the wall 81A of the branch hole 81 of the main pipe 80, the wall 81A of the branch hole 81 is cut to form threads therein. Once the grooves 65A, 65B pass into the interior of the main pipe and no longer contact wall 81A, the thread forming process in the wall 81A stops.

The process described above is carried out until the insertion part 51 of the elongated member 60 is received completely in the main pipe 80 through the branch hole 81 and the body 52 engages the first washer 21 resulting in the second O-ring 20 to be sealingly engaged thereby.

When the whole insertion part 51 is threadably secured in the main pipe 80 through the fitting member 40 and the branch hole 81, perfect internal threads are formed in the wall 81A of the branch hole 81. Therefore, the insertion part 51 and the branch hole 81 are threadably secured together.

The remaining elements of the adapter assembly, namely the first O-ring 10, the fitting member 40, the second O-ring 20, the first washer 21, the second washer 31, the third O-ring 30 and the control valve 70 are as described regarding the first embodiment of the elongated member.

The distance t3 (FIG. 2B) between the termination point 66A, 66B of the each groove 65A and 65B, respectively, and the front end 52A of the body 52 is greater than the thickness t1 of the narrowest part of the fitting member 40 (shown in FIG. 3B). Therefore, when the elongated member 60 and the fitting member 40 are operatively positioned on the main pipe, the first groove 65A and the second groove 65B are completely positioned within the main pipe 80. As a result of this, leakage of the fluid in pipe 80 which may occur through the first groove 65A and the second groove 65B, is prevented.

FIG. 4 is partial sectional view taken along the line A—A in FIG. 1, in an assembled condition. FIG. 4 illustrates the adapter assembly secured to the main pipe 80 through the branch hole 81.

The fitting member 40, the second O-ring 20, the first washer 21 and the body 52 of the elongated member 60, the second washer 31, the third O-ring 30, the control valve (not shown) are positioned as illustrated in FIG. 4.

Fluid flowing in the main pipe 80 flows into the openings, 55A, 55B, 55C, 55D, and into the aperture 50A which extends through parts 51, 53 and body 52 of the elongated member and to the control valve 70 or the like. In the second embodiment of the elongated member since the grooves 65A, 65B do not enter into the aperture 50A, the fluid flow enters the adapter assembly via aperture 50A.

FIG. 5 is a perspective view of the adapter assembly of the present invention operatively secured to the main pipe 80 with either a control valve 70 or a water valve 90 which can be attached to the adapter assembly 50 by the use of the connecting part 53 of the elongated member 60.

The present invention in combination with an ordinary control valve 70 or water valve 90 defines the adapter assembly 50 in use 100.

Thus, the present invention only requires that a branch hole be bored into the installed main pipe through which the adapter assembly can be easily secured to the main pipe without severing the main pipe.

Thus, the present invention decreases the time necessary for branching a pipe.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. A branch adapter assembly for use with a fluid carrying main pipe having a convex external surface with a walled branch hole formed therein, comprising:

an elongated member 60 defining an insertion part 51, a body part 52 and a connecting part 53 with an aperture 50A axially formed therethrough to permit fluid communication through said insertion part 51, said body and said connecting part 53;

said insertion part 51 further includes a terminal end and defines a tapered and externally threaded cylinder 54 with said taper beginning at said terminal end of said insertion part and gradually increasing in diameter therefrom;

a thread forming means for forming threads in said wall of said branch hole of said main pipe, positioned at said tapered and externally threaded cylinder;

a fitting member 40 having a front end 41 and a rear end 42 and with an aperture 40A formed therethrough to permit said insertion part 51 to be received therethrough and with said front end 41 being concave in order to matingly receive a portion of said convex external surface of said main pipe 80; and sealing means for sealing said fitting member against said convex external surface of said main pipe and for sealing said fitting member against said body of said elongated member upon aligning said aperture of said fitting member with said branch hole and inserting said terminal end of said insertion part through said aperture of said fitting member into said branch hole such that said tapered and externally threaded cylinder of said insertion part contact said wall of said branch hole and upon rotating said tapered and externally threaded cylinder of said insertion part gradually moves said terminal end of said insertion part further into said main pipe enabling said thread forming means to cutably engage said wall of said branch hole to form internal threads in said wall and to sealably engage said sealing means whereupon said adapter assembly is threadably secured in said branch hole and is sealed against unintended leakage while enabling fluid communication with said fluid in said main pipe through said aperture formed in said elongated member.

2. The branch adapter assembly of claim 1 wherein said sealing means comprises a portion of said insertion part 51 positioned between said external threads and said body 52 having a smooth cylindrical surface 56 for receiving, in use, a first washer 21 and a second O-ring 20 for enabling a sealing engagement.

3. The branch adapter assembly of claim 1 wherein said front end 41 and said rear end 42 of said fitting member each include an O-ring receiving cavity 41A and 42A formed therein, respectively; and said sealing means comprises a first and a second O-ring for positioning into said O-ring receiving cavity 41A and 42A, respectively, to enable said fitting member to sealingly engage said convex external surface of said main pipe and said body of said elongated member, respectively.

4. The branch adapter assembly of claim 1 wherein said connecting part includes external threads 53A formed therein for use in engaging a control valve 70.

5. The branch adapter assembly of claim 1 wherein said thread forming means comprises a plurality of openings 57 formed in said tapered and externally threaded cylinder 54 of said insertion part proximate said terminal end 51A of said insertion part 51 with said openings exposing cross sections of said threads of said threaded cylinder 54 such that in use upon rotation of said insertion part said exposed cross sections of said threads cutably engage said wall of said branching hole 81 to form threads in said wall and to enable fluid communication with said aperture 50A of the elongated member 60 and to enable any turnings generated during said cutting of said wall of said branch hole to form internal threads in said wall to fall away from a thread cutting-branch hole interface and into said aperture formed in said elongated member.

6. The branch adapter assembly of claim 5 wherein said plurality of openings comprises a first opening 55A, a second opening 55B, a third opening 55C and a fourth opening 55D with said first opening 55A and said third opening 55C, said second opening 55B and said fourth opening 55D being formed at evenly spaced intervals about said tapered and externally threaded cylinder.

7. The branch adapter assembly of claim 6 wherein said openings are paired opposite openings (55A–55C, 55B–55D) which are axially spaced apart relative to each other such that one pair of opposing openings are positioned closer to said terminal end 51A of said insertion part 51 relative to said remaining pair of opposing openings which are positioned further away from said terminal end 51A of said insertion part 51.

8. The branch adapter assembly of claim 1 wherein said thread forming means comprises a plurality of grooves 59 formed in said externally threaded cylinder 54 of said insertion part 51 with each groove extending longitudinally from said terminal end 51A of said insertion part 51 with said grooves exposing cross sections 67,68 of said external threads of said threaded cylinder 54 such that in use upon rotation of said insertion part said exposed cross sections cutably engage said wall of said branching hole 81 to form turnings generated during rotation to fall away from a thread cutting-branch hole interface.

9. The branch adapter assembly of claim 8 wherein said plurality of grooves includes a first groove 65A and a second groove 65B symmetrically formed in said tapered and externally threaded cylinder of said insertion part.

* * * * *